United States Patent Office 3,394,192
Patented July 23, 1968

3,394,192
PREPARATION OF β-MERCAPTOALKANOLS
Howard E. Jones, Wilmington, Del., assignor to E. I. du Pont de Nemours and Company, Wilmington, Del., a corporation of Delaware
No Drawing. Filed Mar. 16, 1966, Ser. No. 534,674
10 Claims. (Cl. 260—609)

This invention relates to processes for the preparation of β-mercaptoalkanols. More particularly, this invention is directed to improved processes for preparing β-mercaptoalkanols from hydrogen sulfide and 1,2-epoxides.

It is known in the art to prepare the β-mercaptoalkanol, 2-mercaptoethanol, from the reaction at atmospheric pressure between hydrogen sulfide and ethylene oxide in the presence of a catalyst or solvent such as water, lower alcohols, porus clay, and alumina. This process has obtained yields on the order of 50 to 60%, based on ethylene oxide. This low yield is believed to be due to the formation of thiodiethanol during the reaction, i.e. the 2-mercaptoethanol initially produced further reacts with the unreacted ethylene oxide to form thiodiethanol.

Various methods have been suggested to improve the process by reducing the formation of thiodiethanol during the reaction. Thus the use of a large excess of hydrogen sulfide in the presence of a catalytic amount of thiodiethanol or 2-mercaptoethanol has been attempted. Another method involves initially interacting the hydrogen sulfide with sodium hydroxide to form hydrosulfide, which is then reacted with ethylene oxide. However, these processes are not completely satisfactory, in that additional neutralization steps are required or recovery and waste disposal steps must be provided.

According to the present invention, there is provided an improved process for preparing β-mercaptoalkanols in surprisingly good yield, which comprises reacting a small excess over the stoichiometric requirement of hydrogen sulfide with a 1,2-epoxide compound of the following general formula:

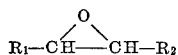

wherein:

$R_1$ is selected from the group consisting of hydrogen, alkyl of 1 to 16 carbon atoms, alkoxyalkyl of 2 to 16 carbon atoms, phenyl, carbomethoxy, carboethoxy, hydroxyalkyl of 1 to 5 carbon atoms and chloroalkyl of 1 to 5 carbon atoms;

$R_2$ is selected from the group consisting of hydrogen or alkyl of 1 to 4 carbon atoms, provided that $R_1$ and $R_2$ can be taken together and are cycloalkyls of 3 to 12 carbon atoms;

in the presence of a trialkylamine with a basic ionization constant, $K_b$, between $10^{-3}$ and $10^{-7}$, at temperatures between 0°–150° C., optionally, in the presence of a solvent, and separating from the reaction mass a β-mercaptoalkanol of the following formula:

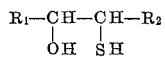

wherein $R_1$ and $R_2$ are the same as above.

The process of the invention can be performed at superatmospheric or atmospheric pressures. In the superatmospheric pressure embodiment it is preferred that sufficient pressure is provided to maintain the system in the liquid state.

STARTING MATERIALS

Hydrogen sulfide is commercially available, and its preparation is well known in the art. Commercial grade hydrogen sulfide can be used in the process of the invention.

The 1,2-epoxides which can be used as a reactant are of the following formula:

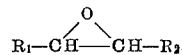

wherein:

$R_1$ can be hydrogen, alkyl of 1 to 16 carbon atoms, alkoxyalkyl of 2 to 16 carbon atoms, phenyl, carbomethoxy, carboethoxy, hydroxyalkyl of 1 to 5 carbon atoms, and chloroalkyl of 1 to 5 carbon atoms; and $R_2$ can be either hydrogen or alkyl of 1 to 4 carbon atoms; also $R_1$ and $R_2$ can be joined or taken together to form a cycloalkyl of 3 to 12 carbon atoms, e.g. cyclohexene oxide.

The preferred 1,2-epoxide, ethylene oxide, is commercially available or it can be prepared by methods well known in the art, e.g. the catalytic oxidation of ethylene by air.

The other 1,2-epoxides are commercially available or can be prepared by well-known methods, e.g. by the action of an alkali on a bromohydrin or chlorohydrin.

The 1,2-epoxides useful in the process of the invention are exemplified by the following:

propylene oxide
styrene oxide
cyclohexene oxide
3-chloro-1,2-propyleneoxide
cyclopentene oxide
3-hydroxy-1,2-propyleneoxide
methylacrylate oxide
ethylacryate oxide
3-methoxy-1,2-propyleneoxide
dodecenyloxide
methylcrotonate oxide
hept-3-eneoxide The improved yield of the process of the invention is created by the presence of the trialkylamine in either the atmospheric or superatmospheric embodiment. Some of the trialkylamines useful in the process of the invention are triethylamine, trimethylamine, tri-n-propylamine, tri-n-butylamine and mixtures thereof.

The trialkylamines having a basic ionization constant, $K_b$, between $10^{-3}$ and $10^{-7}$ are the most useful and of these, triethylamine and trimethylamine are preferred.

Optionally, but preferably, an inert solvent can also be used in the subject process. The particular solvent used and its concentration are not critical. All that is necessary is that it be a solvent for the active ingredients, that it not be reactive during the course of the reaction and that it be liquid at the reaction temperature. Another factor which should be considered in the choice of a solvent is its boiling point; since the β-mercaptoalkanol prepared must be separated from the reaction mass in a still, the boiling point of the solvent should be distinct from that of the β-mercaptoalkanol desired.

In the atmospheric pressure process the lower alcohols, which include methanol, ethanol, propanol, butanol, etc. are particularly useful as solvents. Other solvents that can be used are water, 2-mercaptoethanol, thiodiethanol, dimethylformamide, dimethyl sulfoxide, or mixtures thereof. In the superatmospheric pressure procedure, an inert hydrocarbon solvent, e.g. toluene, mixed with a small amount of water is particularly useful.

REACTION CONDITIONS

In the process of this invention, the hydrogen sulfide and the 1,2-epoxide are usually brought together in a solvent media in a reaction vessel.

The reaction can take place in any suitable reaction vessel, the particular reaction vessel used being dependent on whether the process is conducted at atmospheric or superatmospheric pressure.

One of the advantages of the process of the invention is that only a small excess of hydrogen sulfide over the stoichiometric requirement is necessary for the reaction. Thus in preparing 2-mercaptoethanol only a small molar excess is needed over that required by the equation:

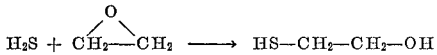

For example, in the above equation, the ratio of moles of hydrogen sulfide to moles of ethylene oxide can be on the order of 1.05:1 to 1.51:1. In the prior art processes to obtain the hydrogen sulfide concentration necessary for a good yield from this reaction, a larger excess of hydrogen sulfide was often used.

The concentration of the trialkylamines present in the reaction vessel can vary and is generally in the range between 0.1% to 50%, by weight. In the atmospheric pressure process, the concentration is normally between 13 and 35%. While in the superatmospheric pressure process the concentration is usually lower, and normally ranges from 1% to 10%. The difference in concentration is due to the fact that in the atmospheric pressure process, the trialkylamines are not only used for catalytic purposes but can also function, in part, as a solvent.

In the atmospheric pressure embodiment of the invention, useful apparatus can be a reaction vessel connected to a packed column, e.g. packed with Raschig rings or porcelain saddles. The column being connected to a suitable head and a receiver.

In one operation of this embodiment, the vessel is charged with the solvent, e.g. a lower alcohol such as methanol, ethanol, n-butanol, etc. and the trialkylamine. In this embodiment, the concentration of the trialkylamine is on the order of 13 to 35%.

Hydrogen sulfide, in either liquid or gas state, is passed into the solution in the vessel and mixed until the solution becomes saturated. Additional hydrogen sulfide and the 1,2-epoxides, e.g. ethylene oxide, are then passed into the solution simultaneously, while maintaining the temperature of the solution in the 25–50° C. range, preferably in the 25–30° C. range. After the reaction is completed, which can take from 1 hour to 7 hours or more, depending upon rate of addition of the reactants, the reaction mass is distilled.

The 2-mercaptoalkanol product can be separated from the other components of the reaction mass by any convenient manner. Generally, this will be by distillation with a suitable still.

This embodiment of the process gives, after distillation, a yield in the range of 80 to 86% of 2-mercaptoethanol based on ethylene oxide, with a correspondingly low yield of thiodiethanol.

The atmospheric pressure embodiment can be further modified by using equipment that provides a gas scrubbing action, thus allowing higher rates of gas introduction. This can be accomplished by using a pump to remove the liquid out of the bottom of the reaction vessel and pass it to the top of the column. Here the liquid is introduced into the packed column and a continuous trickle is maintained down the column, thus any unreacted 1,2-epoxide escaping from the surface of the liquid must pass through this trickle prior to being vented to the atmosphere.

In the superatmospheric pressure embodiment of the invention, an unreactive solvent, e.g. water or an aromatic hydrocarbon such as toluene, or mixtures thereof, is charged to a reactor. Any suitable superatmospheric pressure reactor can be used. An autoclave wherein the 1,2-epoxide and the hydrogen sulfide would be continuously dissolved in a heel of partially converted material with agitation and heat removal followed by a tubular reactor in a constant temperature bath is a suitable reaction vessel.

The pressure maintained in the reactor is sufficient to keep the reactant in the liquid phase, i.e. autogenous pressures. Under the usual temperatures employed, the pressure can be on the order of 15 to 1,000 pounds per square inch.

The solvent added to the reactor is to function as a solvent for the active ingredients and also to promote heat transfer. A small amount of a tertiary amine, e.g. 5 to 35%, is then added as a catalyst, triethylamine or trimethylamine being the preferred amines.

A small amount above the stoichiometric requirement of liquid hydrogen sulfide is then charged into the reactor, e.g. at a ratio of moles hydrogen sulfide to moles 1,2-epoxide, from 1.05:1 to 1.51:1. With suitable agitation and cooling, the 1,2-epoxide, e.g. ethylene oxide, in the liquid phase, is gradually added to the reactor. The reaction between the epoxide and the hydrogen sulfide starts almost immediately. The reaction temperature is controlled in the general range of 60° to 150° C. After the desired amount of ethylene oxide has been fed into the autoclave and the reaction allowed to subside, the liquid reaction product is removed from the reactor and taken to a still for separation.

The reaction is allowed to subside over a period of time dependent upon the temperature of the reaction, the volume of the autoclave, the feed rate and the amount of hydrogen sulfide applied.

The yield of β-mercaptoalkanol, e.g. 2-mercaptoethanol, is nearly quantitative with the 1,2-epoxide used, e.g. a 95% yield based on the epoxide. The amount of thiodiethanol obtained is very low, on the order of 2 to 4% based on the epoxide.

The reaction between the previously described reactant is exothermic in character and will usually proceed without application of external heat. The temperature of the reaction will usually depend upon the particular 1,2-epoxide involved and whether it is operated at atmospheric pressure or under superatmospheric pressure. Generally, the temperature can be within the range of 10 to 150° C. If the process is operated at superatmospheric pressure the temperature is preferably maintained within the range of 60° to 125° C., when it is operated at atmospheric pressure, temperatures between 25° and 50° C. are preferred.

Because of its varied uses, 2-mercaptoethanol is a preferred final product. However, the process of the invention can be used to produce many β-mercaptoalkanols depending upon the 1,2-epoxide used as the initial reactant. The β-mercaptoalkanols that can be prepared are represented by the following formula:

wherein:

$R_1$ is selected from the group consisting of hydrogen, alkyl of 1 to 16 carbon atoms, alkoxyalkyl of 2 to 16 carbon atoms, phenyl, carbomethoxy, carboethoxy, hydroxyalkyl of 1 to 5 carbon atoms and chloroalkyl of 1 to 5 carbon atoms; and $R_2$ is selected from the group consisting of hydrogen or alkyl of 1 to 4 carbon atoms, provided that $R_1$ and $R_2$ can be taken together and are cycloalkyls of 3 to 12 carbon atoms.

The β-mercaptoalkanols, particularly 2-mercaptoethanol, produced by the processes of the invention have many uses by virtue of their marked chelating ability. For example, 2-mercaptoethanol may be used as a metal cleaner as disclosed in assignee's Belgian Patent 630,796, issued Oct. 9, 1963.

The invention will be further illustrated but it is not intended to be limited by the following examples.

Example 1

One thousand ml. of toluene, 25 ml. of triethylamine, and 25 ml. of water are charged to a four-liter autoclave, the autoclave being surrounded by a cooling coil. The autoclave is made of type 316 stainless steel, and equipped with a reciprocating agitator, internal cooling coil and an external electric heater.

Nine hundred and thirty eight g. of liquid hydrogen sulfide is added to the autoclave. The autoclave is heated to 70° C. and an autogenous pressure of 480 p.s.i.g. Liquid ethylene oxide is then pumped into the autoclave at a rate of 0.6 pound per minute. An immediate reaction occurred as is indicated by a rise in temperature and a decrease in pressure. The reaction temperature is controlled at 80° C. by adjusting the flow of water through the cooling coil.

Ethylene oxide is pumped into the autoclave until a total of 1129 g. has been added. The reaction is allowed to subside for about 20 minutes. Upon cooling and discharging the autoclave, 1.42 cu. ft. of vapor, largely hydrogen sulfide and 2868 g. of liquid product is recovered.

The liquid product is then taken to a spinning band column where it is distilled. Distillation gives a 95% yield, based on ethylene oxide, of 2-mercaptoethanol.

Example 2

To demonstrate the atmospheric pressure process the following experimental set up is used. A 300 ml. 35/25 3-neck flask is fitted with a thermometer, a sintered gas dispersion tube, and a 30" x 1" column packed with Raschig rings. The column is in turn fitted with a Claisen head and receiver. Magnetic stirring apparatus is employed to agitate the solution in the flask.

The flask and one-third of the column are filled by the addition of 100 ml. of triethylamine and 350 ml. of methanol. The magnetic stirring is started and hydrogen sulfide in the gaseous state is passed into the solution for 15 minutes to saturate the solution. Then ethylene oxide, also in the gaseous state, and hydrogen sulfide together are passed into the solution for 6 hours and 9 minutes. The rate of gas flow is adjusted and measured by a pair of rotameters until 248 g. (5.64 moles) of ethylene oxide and 282 g. (8.29 moles) of hydrogen sulfide is passed into the solution. The temperature of the reaction is maintained in the 25–30° C. range by placing a dish of cold water around the flask when necessary.

The formation of 2-mercaptoethanol causes the liquid level to rise in the column and the overflow is collected in the receiver at the top. Combining the overflow and the liquid remaining in the column and flask at the end of the run gives 782 g. of solution. This weight is reduced to 758 g. by sparging the solution with nitrogen for a time in order to remove some of the hydrogen sulfide odor. Gas chromatographic analysis of the sparged solution shows it to be 55.3% (99.5% yield) 2-mercaptoethanol by weight and 2.2% (4.9% yield) thiodiethanol by weight. Distillation of 729 g. of this solution through a 36" spinning-band column gives 364 g. (86% in hand yield) of 2-mercaptoethanol and 25 g. of semi-solid residue.

Example 3

Apparatus similar to that described in Example 2 is used, however, the flask has a larger volume, 1000 ml. and the column is a 57" x 1" column packed with 6 mm. porcelain saddles. The flask also has a fourth 18/9 arm which extends to near the bottom of the flask, and has a J-hook at the bottom to prevent the intake of gas bubbles. A bellows pump, capable of either 160 or 250 ml. min.$^{-1}$, continuously pumps liquid out of this fourth arm to the top of the column.

The flask is charged with 500 ml. of methanol and 200 ml. of triethylamine. This amount of liquid fills the pump and its connecting lines and the flask is ½ full. The pump (set at 160 ml. min.$^{-1}$) and magnetic stirring is then started. 64 g. (1.88 moles) of hydrogen sulfide is passed into the flask over a period of 50 minutes, to saturate the solution of methanol and triethylamine. 357 g. (8.12 moles) of ethylene oxide and 315 g. (9.27 moles) of hydrogen sulfide are then passed into the solution until the flask is full, taking about three hours for this to occur. During this time the temperature of the reaction is maintained in the 40–45° C. range by cooling when necessary.

The weight of the liquid recovered after the reaction is completed is 1149 g. After this liquid is sparged for an hour to remove the worst of the hydrogen sulfide odor, this amount is reduced to 1126 g. Gas chromatographic analysis of the sparged solution indicates it to be 49.1% (87.4% yield) of 2-mercaptoethanol by weight and 2.4% (5.5% yield) of thiodiethanol by weight. Distillation 794 g. of this solution through a 36" spinning-band gives 348 g. of 2-mercaptoethanol (80.2% in hand yield).

Example 4

Example 3 is repeated except that the flask and column are charged with 700 ml. of 25% trimethylamine in methanol and the hydrogen sulfide and ethylene oxide are added at rates to obtain a molar ratio of hydrogen sulfide to ethylene oxide to 1.51.

This procedure results in 508 g. (80.3% yield) of 2-mercaptoethanol.

Example 5

Example 2 is repeated except that the apparatus is charged with 100 ml. of triethylamine and 350 ml. of ethanol, and the hydrogen sulfide and ethylene oxide are added at rates to obtain molar ratio of hydrogen sulfide to ethylene oxide of 1.51.

This procedure results in 415 g. (85.5% yield) of 2-mercaptoethanol upon distillation.

Example 6

A solution of 125 g. of triethylamine and 360 ml. of methanol is saturated with hydrogen sulfide. While stirring and maintaining a hydrogen sulfide sparge, 98 g. of 1,2-epoxycyclohexane is added over 1.25 hours. The temperature rises from 38° to 46° C. during the addition.

The stirring and hydrogen sulfide sparge are continued for another 0.5 hour. Low boiling components are removed by distillation at atmospheric pressure and the residue is distilled under reduced pressure. This procedure gives 114 g. (86.3% yield) of 2-mercaptocyclohexanol boiling at 104–105° C./20 mm.

Example 7

A solution of 150 ml. of triethylamine and 475 ml. of absolute ethanol is saturated with hydrogen sulfide. Then while stirring and maintaining a hydrogen sulfide sparge, 157 g. of 1,2-epoxydodecane is added at such a rate that the temperature is maintained between 48° and 51° C.

Stirring and sparging are continued for an hour. At 50° C. low boiling components are removed by distillation at atmospheric pressure and the residue is distilled under reduced pressure. 2-hydroxydodecylmercaptan is collected at 104–107° C./2 mm.

Example 8

A solution of 110 ml. of triethylamine and 200 ml. of methanol is saturated with hydrogen sulfide. While stirring and maintaining a hydrogen sulfide sparge, 100 g. of 3-ethoxy-1,2-epoxypropane is added at such a rate that the temperature remains between 45° and 50° C. The sparge and stirring are continued for one hour.

Low boiling components are removed by distillation at atmospheric pressure and the residue is distilled under reduced pressure. This procedure yields 112 g. (85.5% yield) of 3-ethoxy-2-hydroxypropylmercaptan boiling at 87–88° C./12 mm.

Example 9

A solution (600 ml.) of 25% trimethylamine in methanol is saturated with hydrogen sulfide. Then while stirring and maintaining a hydrogen sulfide sparge, 242 g. of 1,2-epoxypropane is added over 2 hours. Cooling is required to keep the temperature below 50° C. Stirring and sparging are continued for 15 minutes.

Low boiling components are removed by distillation at atmospheric pressure and the residue is distilled under reduced pressure. This procedure gives 312 g. (85% yield) of 2-hydroxypropylmercaptan boiling at 58–60° C./15 mm.

The process of the invention has many advantages and the primary one being that with the use of conventional reaction vessels and inexpensive raw materials, a high yield of β-mercaptoalkanols can be produced.

I claim:

1. In the process of preparing β-mercaptoalkanols by reacting hydrogen sulfide with a 1,2-epoxide compound of the following formula:

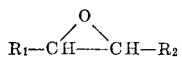

wherein:

$R_1$ is selected from the group consisting of hydrogen, alkyl of 1 to 16 carbon atoms, alkoxyalkyl of 2 to 16 carbon atoms, phenyl, carbomethoxy, carboethoxy, hydroxyalkyl of 1 to 5 carbon atoms and chloroalkyl of 1 to 5 carbon atoms; and $R_2$ is selected from the group consisting of hydrogen, and alkyl of 1 to 4 carbon atoms, provided that $R_1$ and $R_2$ can be joined and are cycloalkyls of 3 through 12 carbon atoms;

and separating from the reaction mass said β-mercaptoalkanols, the improvement of conducting said reaction in the presence of a trialkylamine with a basic ionization constant, $K_b$, between $10^{-3}$ and $10^{-7}$.

2. The process of claim 1 wherein the reaction takes place in the presence of an inert solvent at temperatures from 0° to 150° C.

3. A process as set forth in claim 1 wherein the trialkylamine is triethylamine.

4. A process as set forth in claim 1 wherein the trialkylamine is trimethylamine.

5. A process for preparing 2-mercaptoethanol comprising reacting under pressure a small excess over the stoichiometric requirement of hydrogen sulfide with ethylene oxide in the presence of a trialkylamine with a basic ionization constant, $K_b$, between $10^{-3}$ and $10^{-7}$, and an inert hydrocarbon solvent, at temperatures between 60° and 125° C., and separating said 2-mercaptoethanol from the reaction mass.

6. A process as set forth in claim 5 wherein the trialkylamine is triethylamine.

7. A process as set forth in claim 5 wherein the trialkylamine is triethylmethylamine.

8. A process for preparing 2-mercaptoethanol comprising reacting at atmospheric pressure a small excess over the stoichiometric requirement of hydrogen sulfide with ethylene oxide in the presence of a trialkylamine with a basic ionization constant, $K_b$, between $10^{-3}$ and $10^{-7}$ and a lower alcohol, at temperatures from 25° to 50° C., and separating said 2-mercaptoethanol from the reaction mass.

9. A process as set forth in claim 8 wherein the trialkylamine is triethylamine.

10. A process as set forth in claim 8 wherein the trialkylamine is trimethylamine.

References Cited

UNITED STATES PATENTS 3,086,997  4/1963  Warner _____ 260—609

FOREIGN PATENTS 585,655  2/1947  Great Britain.
769,216  6/1934  France.

CHARLES B. PARKER, *Primary Examiner.*

D. R. PHILLIPS, *Assistant Examiner.*